US008301314B2

(12) United States Patent
Deaver, Sr. et al.

(10) Patent No.: US 8,301,314 B2
(45) Date of Patent: Oct. 30, 2012

(54) SYSTEM AND METHOD FOR PROVIDING VOLTAGE REGULATION IN A POWER DISTRIBUTION NETWORK

(75) Inventors: Brian J. Deaver, Sr., Fallston, MD (US); Melvin L. Barnes, Jr., Annapolis, MD (US)

(73) Assignee: S&C Electric Company, Chicago, IL (US)

( * ) Notice: Subject to any disclaimer, the term of this patent is extended or adjusted under 35 U.S.C. 154(b) by 909 days.

(21) Appl. No.: 12/362,176

(22) Filed: Jan. 29, 2009

(65) Prior Publication Data

US 2010/0191389 A1    Jul. 29, 2010

(51) Int. Cl.
G05D 3/12    (2006.01)
(52) U.S. Cl. .......................... 700/298; 700/291; 700/297
(58) Field of Classification Search .................. 700/297, 700/291, 298
See application file for complete search history.

(56) References Cited

U.S. PATENT DOCUMENTS

| | | | | |
|---|---|---|---|---|
| 4,360,881 A * | 11/1982 | Martinson | ...................... | 700/298 |
| 4,419,619 A * | 12/1983 | Jindrick et al. | ............... | 700/298 |
| 5,422,561 A * | 6/1995 | Williams et al. | .............. | 700/298 |
| 5,570,007 A | 10/1996 | Larsen | | |
| 5,737,209 A * | 4/1998 | Stevens | ......................... | 363/143 |
| 5,760,492 A | 6/1998 | Kanoi et al. | | |
| 6,980,090 B2 * | 12/2005 | Mollenkopf | .................. | 375/258 |
| 6,998,962 B2 * | 2/2006 | Cope et al. | .............. | 340/310.17 |
| 7,053,756 B2 * | 5/2006 | Mollenkopf et al. | ......... | 340/533 |
| 7,064,654 B2 * | 6/2006 | Berkman et al. | ......... | 340/310.13 |
| 7,069,117 B2 | 6/2006 | Wilson et al. | | |
| 7,076,378 B1 * | 7/2006 | Huebner | ......................... | 702/69 |
| 7,155,320 B2 * | 12/2006 | Gee | .............................. | 700/295 |
| 7,218,998 B1 * | 5/2007 | Neale | ............................. | 700/295 |
| 7,231,280 B2 * | 6/2007 | Costa | ............................ | 700/295 |
| 7,231,281 B2 * | 6/2007 | Costa | ............................ | 700/295 |
| 7,245,212 B2 * | 7/2007 | Cope et al. | ............. | 340/310.16 |
| 7,245,472 B2 * | 7/2007 | Davidow | ...................... | 361/118 |
| 7,259,657 B2 * | 8/2007 | Mollenkopf et al. | ...... | 340/12.32 |
| 7,301,440 B2 * | 11/2007 | Mollenkopf | .............. | 340/12.32 |

(Continued)

OTHER PUBLICATIONS

Wilson, T. L., "Energy Conservation with Voltage Reduction—Fact or Fantasy", *IEEE 2002*, (2002),1-7.

Primary Examiner — Mohammad Ali
Assistant Examiner — Kelvin Booker (57) ABSTRACT

A system, device and method for regulating the voltage at a customer premises that is supplied power via a first medium voltage power line is provided. In one embodiment, the method of using a computer system comprises determining medium voltage (MV) data comprising data of the voltage supplied to the first medium voltage power line at a plurality of times, storing the MV data for each of the plurality of times in a memory, determining current data comprising data of a current supplied to the medium voltage power line at the plurality of times, storing the current data at each of the plurality of times in memory in association with the voltage data of the same time. In addition, the method includes receiving low voltage data comprising data of a voltage measurement of a low voltage power line conductor at the customer premises at a plurality of times, storing at least some of the low voltage data in memory in association with MV data that corresponds to the voltage supplied to the first medium voltage power line during the voltage measurement of the low voltage power line conductor, and determining a supply voltage to be supplied to the first medium voltage power line based on the current data stored in memory, MV data stored in memory, and the low voltage data stored in memory.

24 Claims, 7 Drawing Sheets

U.S. PATENT DOCUMENTS

| | | | |
|---|---|---|---|
| 7,447,568 B2* | 11/2008 | Christensen et al. | 700/298 |
| 7,680,548 B2* | 3/2010 | Khorramshahi | 700/22 |
| 7,715,951 B2* | 5/2010 | Forbes et al. | 700/291 |
| 7,957,160 B2* | 6/2011 | Babcock et al. | 363/16 |
| 7,962,536 B2* | 6/2011 | Culp et al. | 700/291 |
| 2002/0198629 A1* | 12/2002 | Ellis | 700/286 |
| 2002/0198648 A1* | 12/2002 | Gilbreth et al. | 701/100 |
| 2004/0082203 A1* | 4/2004 | Logvinov et al. | 439/10 |
| 2004/0158360 A1* | 8/2004 | Garland et al. | 700/286 |
| 2004/0260488 A1 | 12/2004 | Al-Hamrani | |
| 2005/0001694 A1* | 1/2005 | Berkman | 333/100 |
| 2006/0195229 A1 | 8/2006 | Bell et al. | |
| 2007/0002772 A1* | 1/2007 | Berkman et al. | 370/257 |
| 2007/0090811 A1 | 4/2007 | Labuschagne | |
| 2008/0143491 A1* | 6/2008 | Deaver | 340/310.11 |
| 2008/0319893 A1* | 12/2008 | Mashinsky et al. | 705/37 |
| 2009/0043519 A1* | 2/2009 | Bridges et al. | 702/62 |
| 2009/0043520 A1* | 2/2009 | Pollack et al. | 702/62 |
| 2009/0073726 A1* | 3/2009 | Babcock | 363/20 |
| 2009/0138100 A1* | 5/2009 | Khorramshahi | 700/22 |
| 2009/0187284 A1* | 7/2009 | Kreiss et al. | 700/291 |
| 2009/0265042 A1* | 10/2009 | Mollenkopf et al. | 700/298 |
| 2009/0276170 A1 | 11/2009 | Bickel | |
| 2009/0281679 A1 | 11/2009 | Taft et al. | |
| 2010/0076612 A1* | 3/2010 | Robertson | 700/286 |
| 2010/0076835 A1* | 3/2010 | Silverman | 705/14.33 |
| 2010/0094479 A1* | 4/2010 | Keefe | 700/298 |
| 2010/0114395 A1* | 5/2010 | Hinatsu et al. | 700/295 |
| 2010/0217550 A1* | 8/2010 | Crabtree et al. | 702/62 |
| 2010/0292853 A1* | 11/2010 | McDonnell | 700/287 |
| 2011/0149618 A1* | 6/2011 | Babcock et al. | 363/40 |
| 2011/0169461 A1* | 7/2011 | Deaver, Sr. | 700/293 |
| 2012/0123606 A1* | 5/2012 | Mollenkopf et al. | 700/298 |

* cited by examiner

| Time | Substation Voltage | Substation Current | CP Voltage |
|---|---|---|---|
| A | 15000 | 300 | 114 |
| B | 14900 | 305 | 118 |
| C | 15100 | 305 | 120 |
| D | 15000 | 290 | 117 |
| E | 15100 | 300 | 116 |

SYSTEM AND METHOD FOR PROVIDING VOLTAGE REGULATION IN A POWER DISTRIBUTION NETWORK

FIELD OF THE INVENTION

The present invention generally relates to the operating a power distribution system and more particularly, to a system and method for operating a power distribution system to control the voltages supplied to customer premises by the power distribution system.

BACKGROUND OF THE INVENTION

The economic and environmental cost of generating and distributing power to power customers is enormous. Even a small percentage reduction in power consumption translates to an enormous financial savings and reduced emissions.

Figure 1:
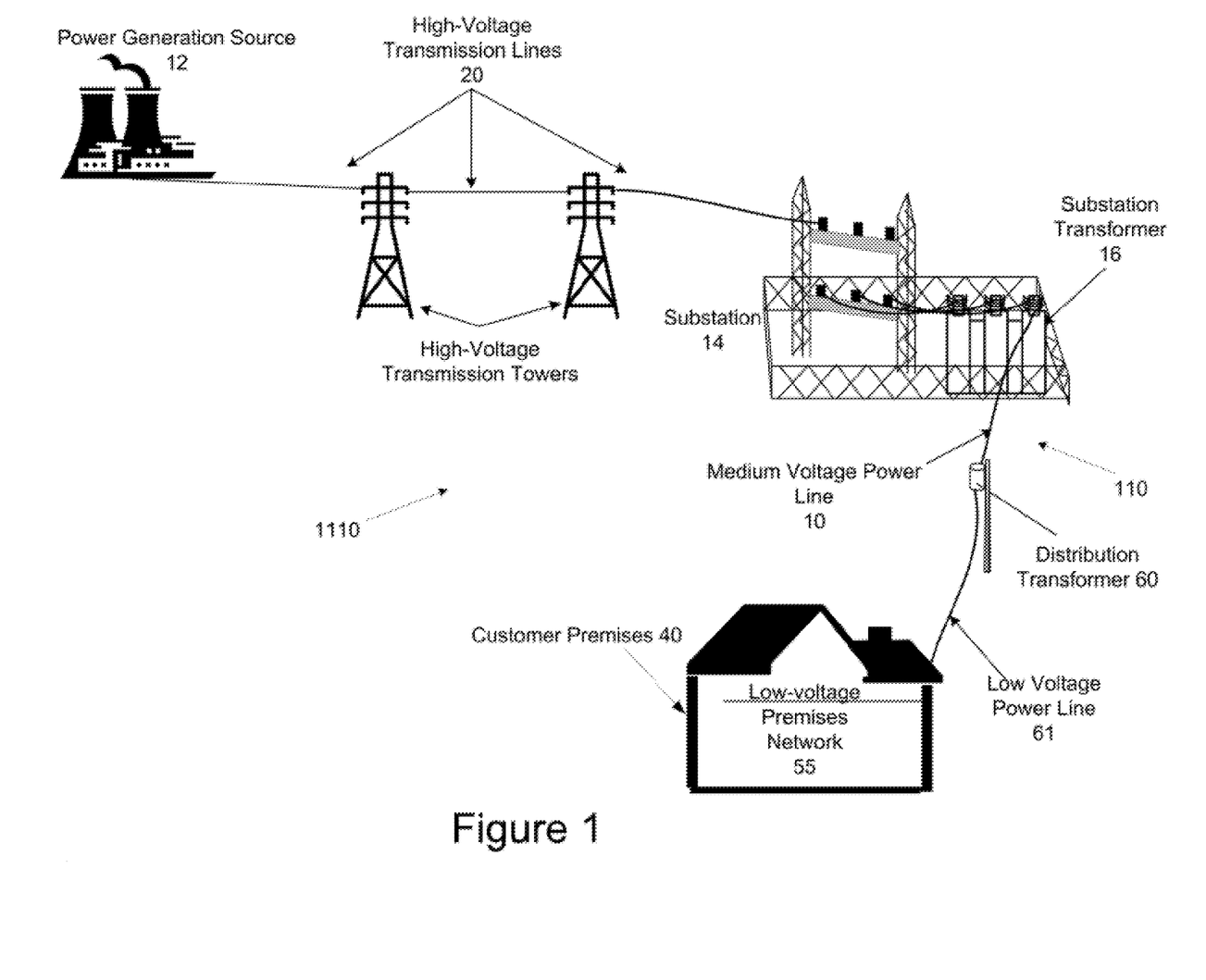
FIG. 1 depicts a conventional power distribution system.

FIG. 1 illustrates a conventional power grid 1110. Power is conducted from the substation 14 to one or more distribution transformers 60 over one or more medium voltage (MV) power lines 20. Power is conducted from the distribution transformer 60 to the customer premises 40 via one or more low voltage (LV) power lines 61 (typically carrying 120-240 volts in the US). Customer premises 40 include a low voltage premises network 55 that provides power to individual power outlets within the customer premises 40.

While FIG. 1 depicts only a single customer premises 40, in practice MV power lines 10 extend for considerable distances and provide power to numerous residential and business customers. The voltage supplied to those power customers that are farthest from the substation may be considerably less than the voltage supplied to power customers that are near the substation because of losses caused by the power distribution system. During power distribution, the voltage supplied to the medium voltage power line 10 by the substation 14 must be maintained so that the voltage at all the customer premises satisfies regulatory requirements. Utilities typically must make an educated "guess" as to the voltage required to be supplied by the substation 14 based on an estimated voltage drop to the power customers receiving the lowest voltages. The voltage supplied by the substation is regulated (i.e., controlled) according to this estimated voltage drop.

In addition, an engineering margin must be added to the estimated voltage to be delivered to the power customers due to the uncertainty of the losses of various components of the power grid 1110 such as, for example, transformer losses and power line losses. Thus, a voltage provided by a substation 14 may be regulated based on an educated "guess" of the voltage drop plus an added voltage to provide a margin of error. Regulating a voltage based on an educated "guess" and a margin of error often results in the utility providing a voltage that is higher than required by regulatory requirements, which in some instances causes a greater than necessary delivery of power. Currently, there is no cost efficient means for an electric utility to accurately determine the precise voltage to be supplied by a substation 14 to provide a desired voltage at a customer premises. These and other advantages are provided by various embodiments of the present invention.

SUMMARY OF THE INVENTION

The present invention provides a system, device and method for regulating the voltage at a customer premises that is supplied power via a medium voltage power line. In one embodiment, the method of using a computer system comprises determining medium voltage (MV) data comprising data of the voltage supplied to the first medium voltage power line at a plurality of times, storing the MV data for each of the plurality of times in a memory, determining current data comprising data of a current supplied to the medium voltage power line at the plurality of times, storing the current data at each of the plurality of times in memory in association with the voltage data of the same time. In addition, the method includes receiving low voltage data comprising data of a voltage measurement of a low voltage power line conductor at the customer premises at a plurality of times, storing at least some of the low voltage data in memory in association with MV data that corresponds to the voltage supplied to the first medium voltage power line during the voltage measurement of the low voltage power line conductor, and determining a supply voltage to be supplied to the first medium voltage power line based on the current data stored in memory, MV data stored in memory, and the low voltage data stored in memory.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

In accordance with the principles disclosed herein, a heuristic model for performing Conservation Voltage Reduction (CVR)—or otherwise providing voltage control—without real time data is disclosed. In particular, a model for doing CVR is disclosed that uses historical voltage and current data for elements of a power grid 100 that may include a substation 14 and one or more customer premises 40.

Various embodiments of the present invention provide a system and method of determining voltage and current data for a power distribution system 100. The data may be collected by a Monitoring System (MS) 150 as a basis to determine a new voltage to be supplied by the substation 14. More specifically, data of the new voltage may be supplied by a substation voltage controller 50 to adjust a voltage supplied to a MV power line 10 by the substation 14.

Various embodiments of the invention may use time stamped voltage measurements from one or more customer premises (CP) 40 and determine (retrospectively) the current and voltage that was supplied by the substation 14 to the MV power line when the voltage measurements were taken. In addition, the MS 150 may determine (retrospectively) the configuration of various power grid infrastructure (e.g., the load tap changers, capacitor banks, reclosers, switches, etc.) at the times of the voltage measurements. From an analysis of the grid infrastructure (voltage, current, configurations) at the time stamp times, the system over time may "learn" what voltage to supply to an MV power line to provide a desired voltage at a customer premises under a given load (current) and configuration, which may allow for intelligent control of the substation 14 to increase or decrease the voltage supplied to the MV power line 10.

In accordance with the principles disclosed herein, the MS 150 may populate and maintain a database of voltage data and current data as received from one or more substations 14 and one or more customer premises 40. The MS 150 may also have access to configuration data for identifying the configuration of the power grid. Each record of voltage data and current data may be time stamped to create a model of the voltage and current characteristics of the power distribution system 100.

Figure 2:
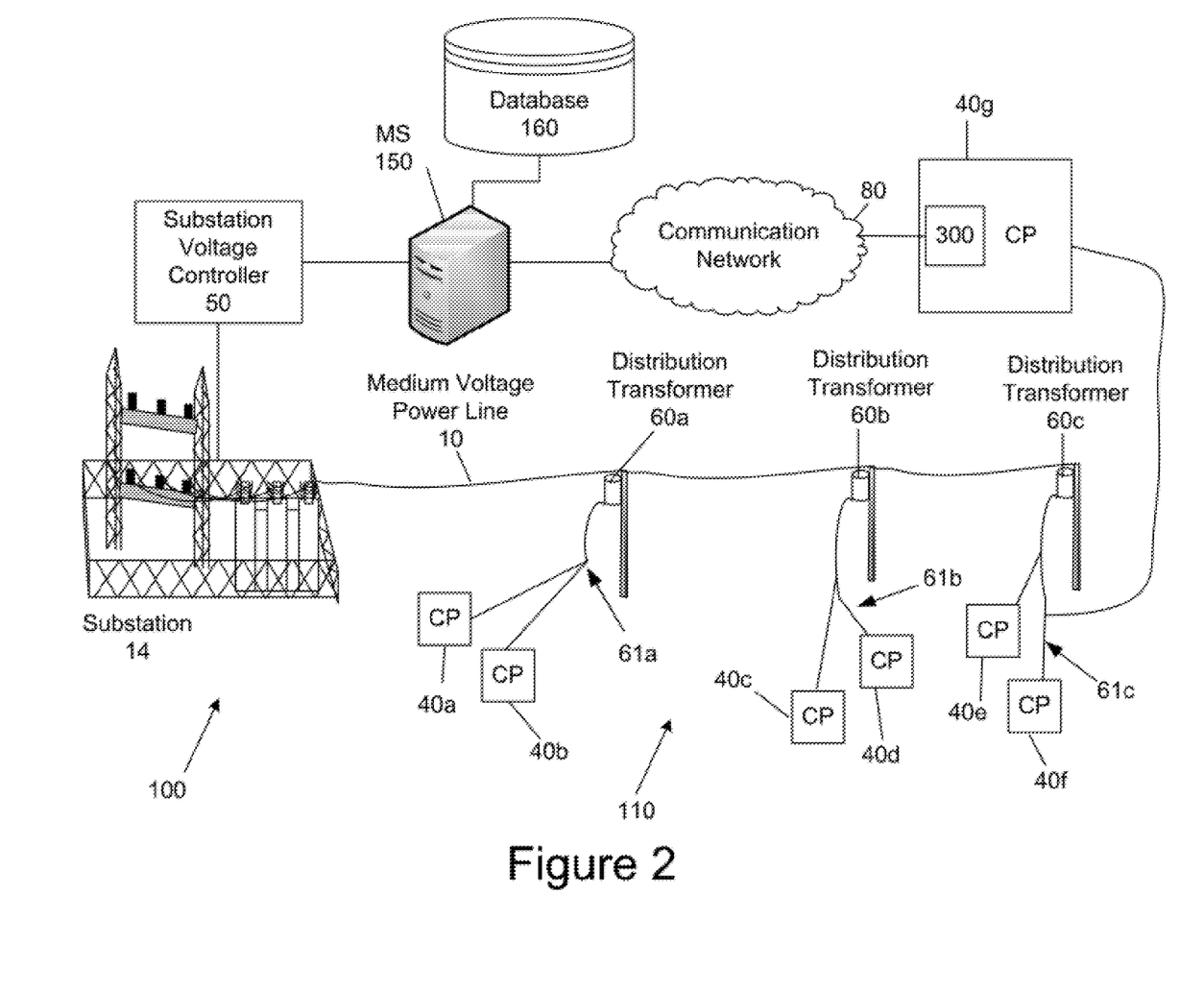
FIG. 2 is a diagram of a power distribution system incorporating a Monitoring System (MS), in accordance with an example embodiment of the present invention.

FIG. 2 is a diagram of a power distribution system 100 incorporating a Monitoring System (MS) 150, in accordance with an example embodiment of the present invention.

Substation load tap changer controllers 50 controls the voltage supplied to medium voltage (MV) power line 10 by the substation 14. In this embodiment, the substation load tap changer voltage controller 50 may receive voltage instructions from MS 150.

The MS 150 may send voltage instructions to the substation load tap changer voltage controller 50 to adjust the voltage supplied to medium voltage power line 10 by substation 14. The MS 150 may store various types of parameters that serve as a basis from which to formulate and send instructions to the substation voltage controller 50. The MS 150 may store the various types of parameters in a database 160, as discussed in more detail in FIG. 2.

Although the MS 150 is shown as being a separate component from substation load tap changer voltage controller 50 and database 160, any or all of the functional elements may be integrated together. Such alternate embodiments are within the spirit and scope of the invention.

Communication network 80 allows a customer premises voltage monitor (CPVM) 300 to communicate with the MS 150. Communication network 80 may be formed of any medium that allows a CPVM 300 and MS 150 to communicate with one another. For example, communication network 80 may be the Internet and include a variety of communication mediums (e.g., cable, fiber, WiFi, WiMAX, DSL, etc.), PLCS 110, HomePlug network, HomePNA network, telephone network (e.g., landline or cellular), etc.

One or more customer premises 40 may be selected by an electric utility company as a desired point within the power distribution system 100 that will be voltage monitored. For example, customer premises 40g may be selected by an electric utility company as a desired location within the power grid 100 that will be voltage monitored. Customer premises 40g may be associated with substation 14 in memory of the MS 150. In other words, substation 14 is a substation that provides power to an MV power line 10 that supplies power to customer premises 40g.

Voltage control may be an iterative process in which small changes in the voltage produced by substation 14 are determined to provide a resultant voltage at a customer premises 40 (under a given load and configuration). The resultant voltage from the adjustment may be further used to adjust the voltage produced by substation 14. This process may continue as needed to make the voltage produced by substation 14 as close to a target voltage (e.g., a regulatory requirement) as desired by an electric utility company.

Although only a single customer premises 40g is shown to include a CPVM 300, an electric utility company may select any number of customer premises 40 as locations within the power distribution system 100 to monitor a voltage. For example, an electric utility company may select multiple customer premises 40 that experience an approximately equal estimated voltage drops as locations within the power distribution system to monitor a voltage. In another embodiment, the CPVM 300 is an automated electric utility meter and a CPVM 300 is located at each and every customer premises 40 associated with an MV power line 10. Monitoring of multiple customer premises 40 that have an approximately equal estimated voltage allows an electric utility company to assess whether their estimations for other parts of the power distribution system 100 comport with real world voltages for those particular locations.

The location of a CPVM(s) 300 may be recorded in memory (e.g., in database 160). Each CPVM 300 may be assigned a unique CPVM 300 identification number (hereinafter "ID"). This unique CPVM 300 ID (which may comprise a Media Access Control (MAC) address) may be associated in memory with one or more substations 14 that provides power to that customer premises 40. The location of a CPVM 300 may be recorded in the memory through a variety of methods that includes, e.g., a web page interface, a database entry system, a telephone prompt entry system, etc. In this manner, a location for CPVM 300 that reports a voltage may be used to identify its associated substation 14 that controls that voltage supplied thereto. Once a substation 14 that supplies power to that customer premises is identified, additional processing of the voltage data may be performed and that substation 14 may be provided a voltage instruction for supplying a new voltage to the medium voltage power line 10.

Figure 3:
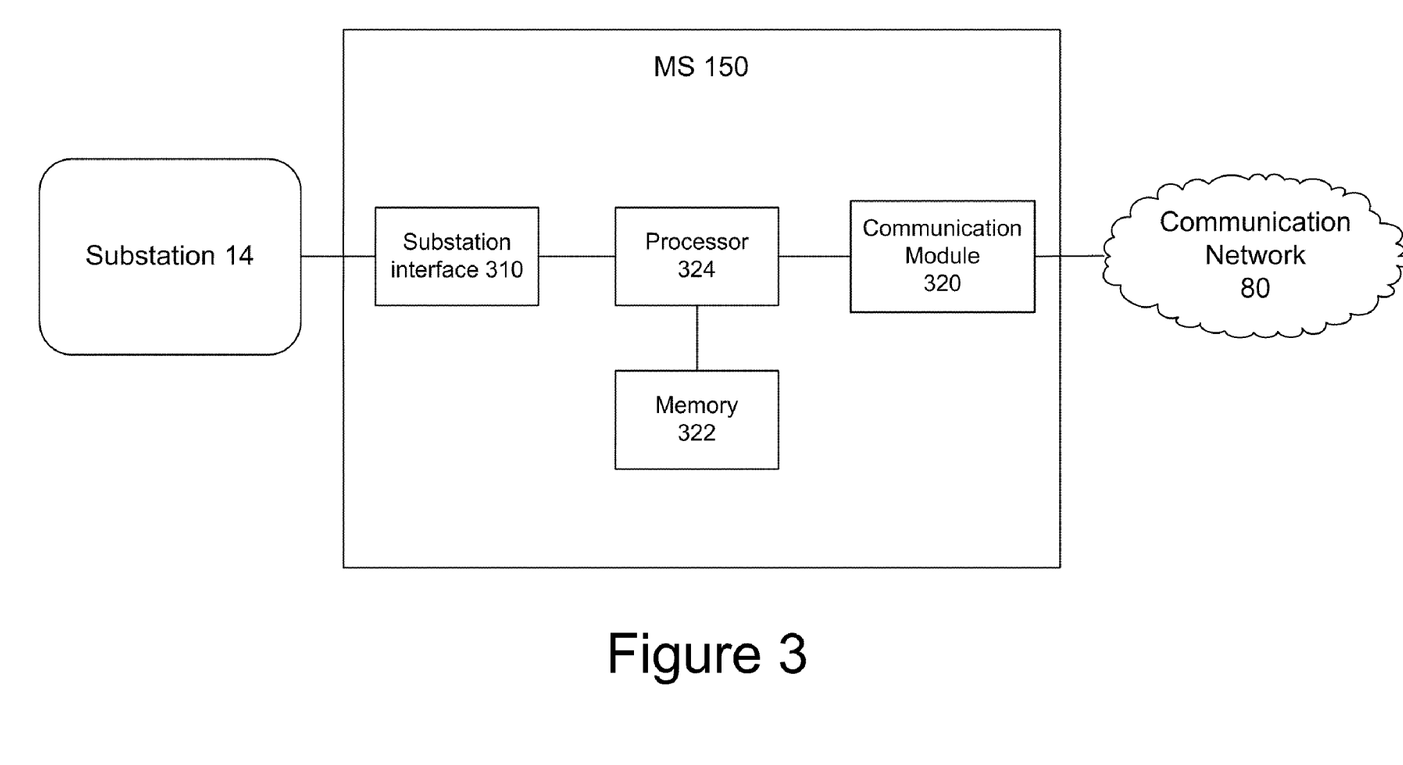
FIG. 3 depicts Monitoring System (MS), in accordance with an example embodiment of the present invention.

FIG. 3 shows Monitoring System (MS) 150, in accordance with an example embodiment of the present invention. In particular, the MS 150 may include a processor 324, a substation interface 310 and a communication module 320. In some embodiments, the MS 150 may be a general purpose computer with a processor executing program code stored in memory to perform the functions disclosed herein and store the data disclosed herein.

Communication module 320 allows the MS 150 to communicate with one or more CPVMs 300. Communication module 320 may be any of a variety of communications modules suitable for a particular communication medium. Communication module 320 may be a telephone line modem, an Ethernet adapter, a fiber optic adapter, a wireless network adapter, a mobile telephone transceiver, a cellular network adapter, etc. Communication module 320 may include an appropriate transmit buffer and receive buffer, as is known within the art. Thus, communication module 320 may be any type of data interface that allows the MS 150 to communicate with a CPVM 300.

Substation interface 310 is used to communicate with the substation load tap changer controller 50 and may include a transceiver for communicating with the substation load tap changer controller 50. The processor 324 may formulate and send one or more voltage instructions to substation 14 via the substation interface 310. As discussed in more detail with relation to FIGS. 5 and 6, processor 324 may determine a new voltage for substation 14 based on a voltage as measured at a CP 40 (and current and configuration data). Processor 324 also may determine the substation 14 that is associated with a particular CPVM 300 (i.e., the customer premises 40 in which the CPVM 300 is located) by retrieving such information from memory 322 (or database 160). Depending upon the particular equipment used at a substation 14, processor 324 forms an appropriate voltage adjustment instruction to instruct substation 14 to change the supplied voltage accordingly. For example, the Load Tap Changer (LTC) controller 50 may put in a manual mode and transmitted RAISE or LOWER commands from the MS 150. In this example, the present invention fully takes over the function of the LTC controller and simply uses it as a path to control the LTC itself. In another example, the LTC controller 50 configuration/settings may be adjusted so that the LTC controller 50 uses its internal logic to issue the RAISE or LOWER command. This method has the benefit of taking advantage of all of the LTC controller basic functions (so they do not need to be recreated in (or performed by) the MS 150) and also allows for the potential that the MS 150 stops working or cannot communicate with the LTC controller 50. If that were to occur, the LTC controller 50 would continue to try to keep voltages at the most recent voltage level.

The communication module 320 also may allow the MS 150 to communicate with the database 160. Alternately, the database 160 may be an integral part of the MS 150.

Figure 4:
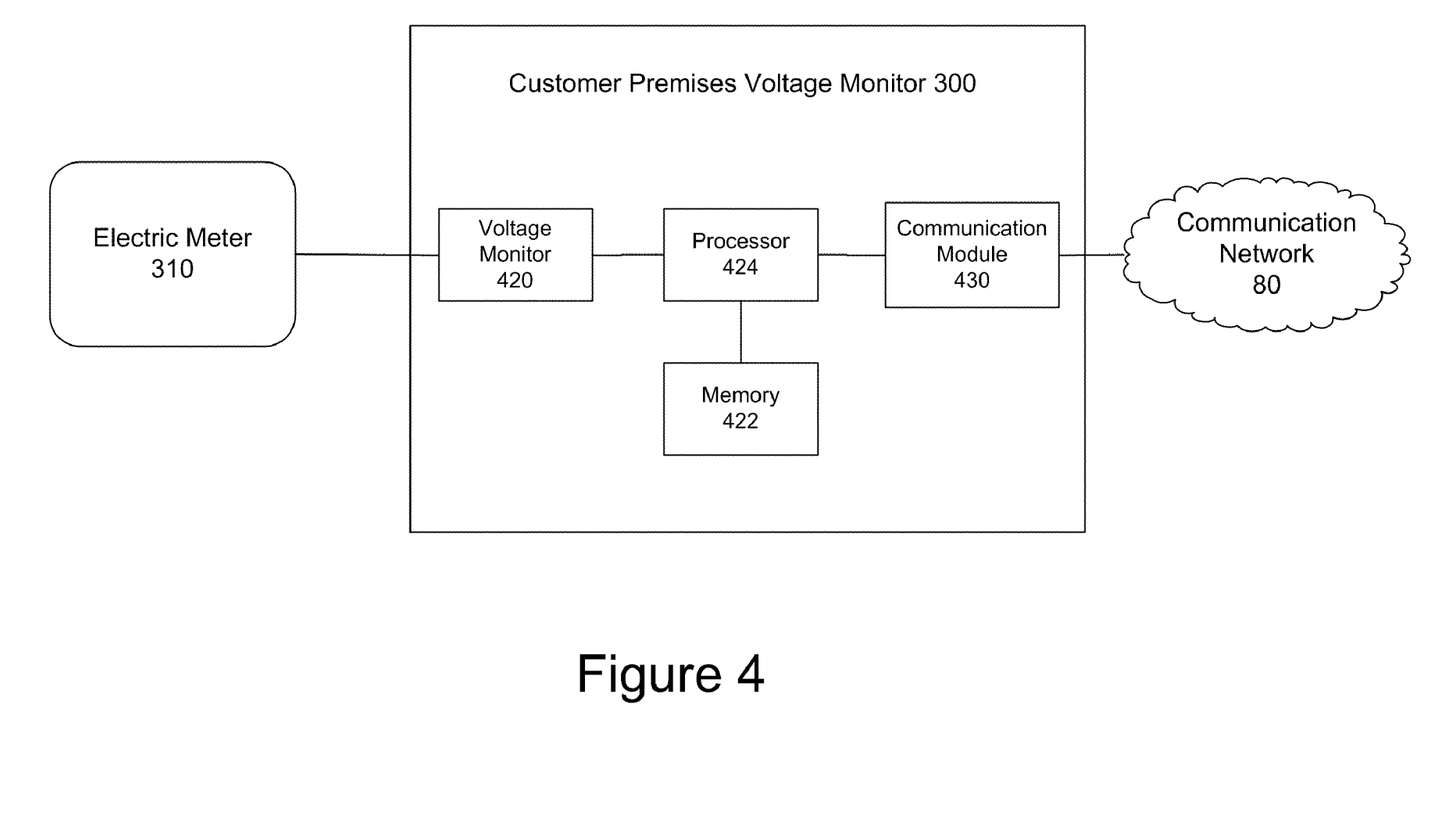
FIG. 4 depicts a customer premises voltage monitor (CPVM), in accordance with an example embodiment of the present invention.

FIG. 4 shows customer premises voltage monitor (CPVM) 300, in accordance with an example embodiment of the present invention. In particular, the customer premises voltage monitor 300 may include a voltage monitor 420, communication module 430, a processor 424 and a memory 422. Processor 424 may control the operation of the other components and execute program code in memory 422 to do so.

In this embodiment, the monitor 300 forms part of an electric utility meter. In other embodiments, the monitor 300 may be connected to an electric socket within the home or otherwise connected to the (external or internal) low voltage power line network to measure the voltage thereof.

The voltage monitor module 420 measures the measures the RMS voltage of the low voltage power line conductor. Thus, the voltage monitor 420 may include an analog to digital converter or a digital signal processor. The measurement data is provided to processor 424. Processor 424 may provide voltage data and/or an alert to be transmitted by communication module 430. In addition to measuring the voltage over time (i.e., monitoring the voltage), the voltage monitor (or more generally the electric monitor) may also be configured to measure and monitor the power factor, harmonics, voltage noise, voltage spikes, peak-to-peak voltage.

The communication module 430 allows the CPVM 300 to communicate with the MS 150. Communication module 430 may be any of a variety of communications modules that are suitable for a particular communication medium. Communication module 430 may be a telephone line modem, an Ethernet adapter, a fiber optic adapter, a wireless network adapter, a mobile telephone network transceiver, a cellular network adapter, etc. Communication module 430 may include an appropriate transmit buffer and receive buffer, as is known within the art. Thus, communication module 430 may be any type of data interface that allows the CPVM 300 to communicate with a VCM 150.

Memory 422 may store voltage data as measured by the voltage monitor 420 and time stamp data (date and time) for each measurement. Memory 422 may also store a unique ID (e.g., serial) number for the CPVM 300 that allows a MS 150 to uniquely identify the CPVM 300 on a power grid 100. In some embodiments, memory 422 may store program code to be executed by processor 424 as well as parameters such as thresholds (minimum and maximum voltages) that are used as a basis to transmit an alert to the MS 150, if the CPVM 300 is so configured. More specifically, the processor 424 may compare the measurement data from the voltage monitor 420 with the minimum and maximum threshold data retrieved from memory and, if a threshold is exceeded (too high or low) the processor 424 transmits an alert to the MS 150 via the communication module 430. In addition or alternately, MS 150 may request data from the CPVM 300 and the processor 424 retrieves the time stamped data from memory 422 and transmits the time stamped data to the MS 150. The memory 422 may also store frequency data that includes and controls the frequency of voltage measurements to be made by the voltage monitor 420 as controlled by processor 424.

The MS 150 (or other computer system) may transmit program code, gateway IP address(es), frequency data, and/or threshold values for storage in memory 422 of the CPVM 300 to be used by the processor 424 to perform various processing. The voltage data and its associated time stamp data may be communicated (e.g. along with power usage data for the associated customer premises) to the MS 150 at any convenient time that includes, during monthly meter readings for billing purposes and/or at night when bandwidth usage is typically low.

Figure 5:
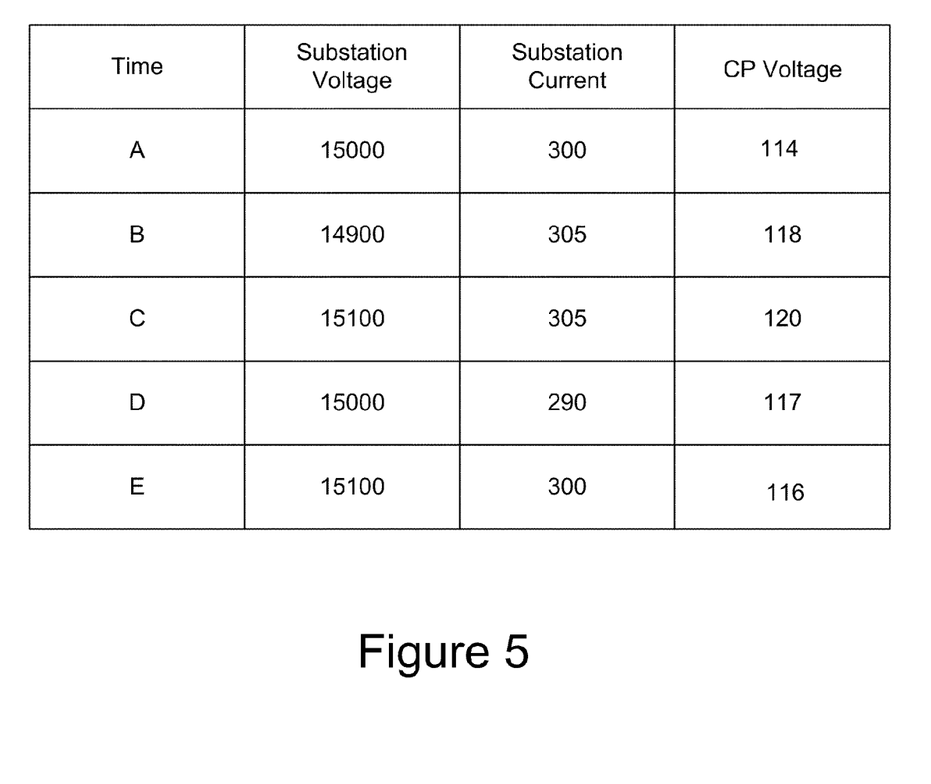
FIG. 5 depicts a portion of a database, in accordance with an example embodiment of the present invention.

FIG. 5 shows a portion of a database 160, in accordance with an example embodiment of the present invention. The illustrated portion may be associated with a particular configuration or each record may also include configuration data (not shown). For example, additional fields other than those shown may include fields for configurations for one or more of capacitor banks, reclosers, switches, etc.

As illustrated, the records include fields for data of the voltage supplied to an MV power line by the substation (Substation Voltage), the current supplied to the MV power line by the substation (Substation Current), and a low voltage measurement of the power at a customer premises as measured by a CPVM 300 (CP Voltage). For example, referring to FIG. 5 at a time "A", a substation voltage was 15000 volts and the substation current was as 300 amps. The voltage at a CPVM 300 was measured at 114 volts (e.g., RMS). The database includes similar data for a plurality of other times B-E (and in practice, many more times). The data is populated into the database 160 via any suitable method. In one embodiment, the MS 150 receives the voltage and current data (along with time stamp data or in real time) from the voltage controller 50 and stores the data in the database 160. In addition, the MS 150 receives and stores the low voltage data from the CPVMs 300. In addition, the MS may receive configuration data from a utility computer system that may received (or accessed) in substantially real time or time stamped. By then sorting the data according to time, the MS 150 can easily correlate a voltage measured at a customer premises with a supplied voltage and current and associated configuration.

Based on data in the database 160, the MS 150 may determine a voltage setting (or adjustment) for the substation 14 given an existing current draw and configuration. For example, based on data of the database 160 of FIG. 5, the MS 150 may determine that a current draw of 300 amps while providing 15,000 volts provides a voltage of 114 volts at a customer premises although it may be desirable (e.g., due to regulatory requirements) to provide 115 volts to all customer premises. Thus, upon receiving data indicated that the substation is supplying 300 amps and at 15,000 volts, the MS 150 may generate voltage instructions that cause the substation 14 to increase the supplied voltage slightly to thereby increase the voltage at the customer premises. Additionally, the database 160 may allow the MS to predict the draw of current and, therefore, the voltage to be supplied. For example, from data in the database 500, the MS 150 may determine that a current draw will be relatively high due to air conditioning during select times of the day and year (e.g., summer afternoons), and the set of high current draws require particular voltages to be supplied by one or more substations 14 to meet regulatory requirements. Thus, in accordance with the principles disclosed herein, the MS 150 may (in some embodiments) facilitate the prediction of the necessary voltages due to the historical record of current draws and such voltages can be supplied slightly ahead of, or concurrently with, the current draws, Moreover, because a voltage adjustment at a substation 14 requires a time period to elapse (e.g., an hour, day, week, or month) before it is known if the voltage at the customer premises has obtained the desired voltage (when measurement data is received), the database 160 allows an electric utility company to adjust a voltage at a substation 14 with advance knowledge of the resultant voltage based on the historical data stored in the database 160. As will be evident to those skilled in the art, the advance knowledge may only be available after the database is sufficiently populated with data, which may take some time (e.g., weeks, months or a year) to occur.

Figure 6:
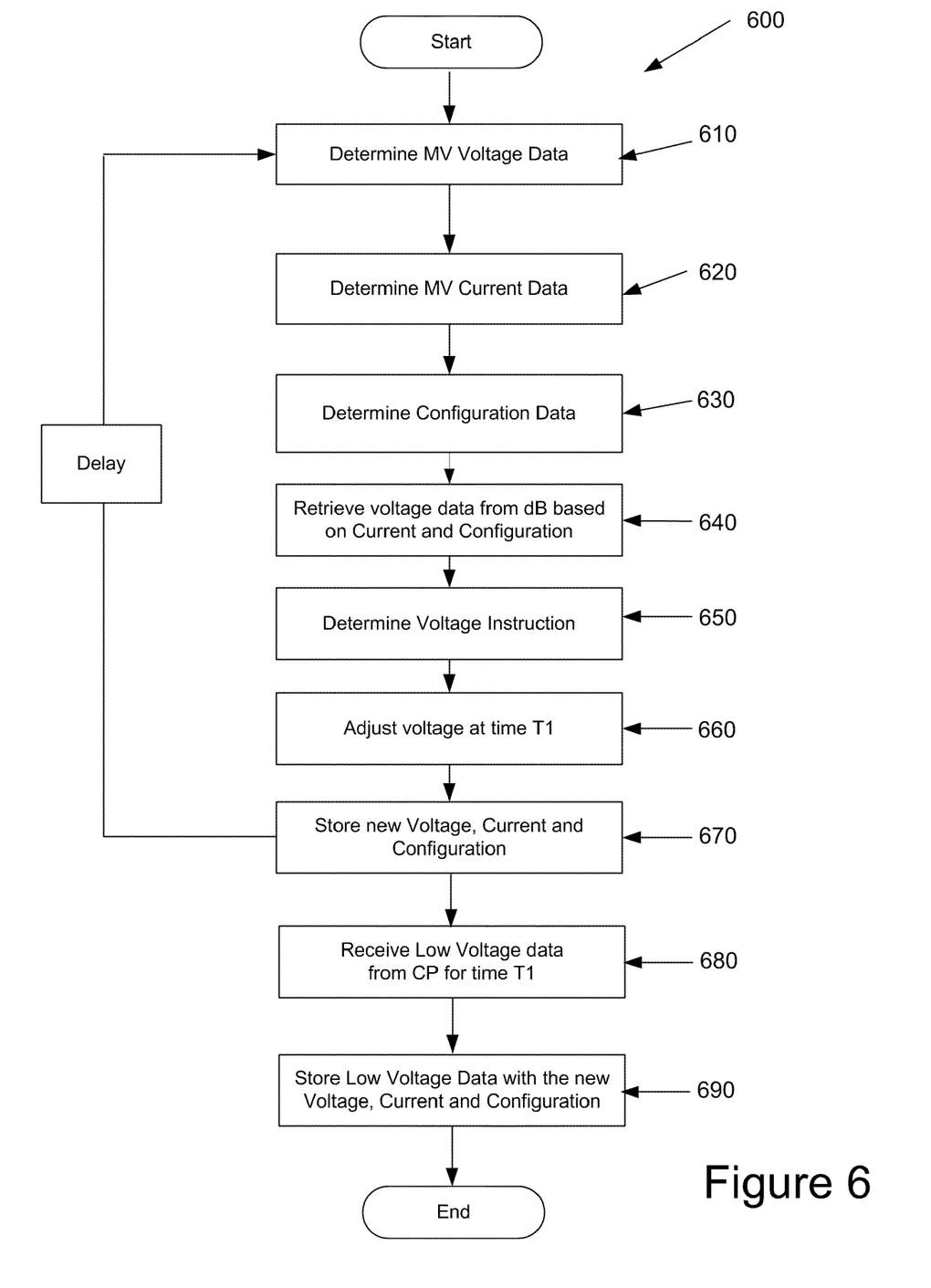
FIG. 6 depicts a method of using a computer system to control the voltage supplied to a customer premises, in accordance with an example embodiment of the present invention.
Figure 7:
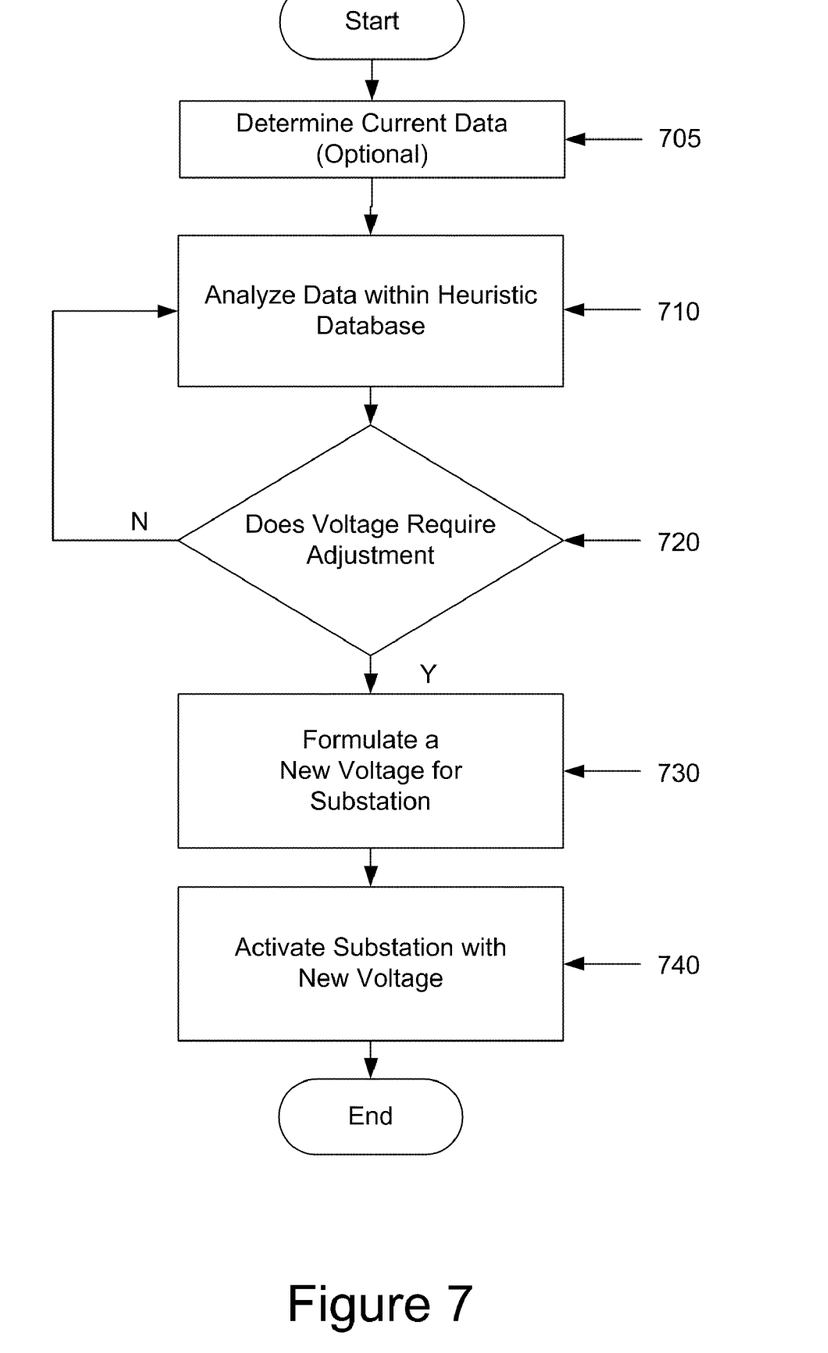
FIG. 7 shows a process of adjusting a voltage at a substation, in accordance with an example embodiment of the present invention.

FIG. 6 depicts a process 600 of populating a database and controlling a voltage based on the database data, in accordance with an example embodiment of the present invention. In some embodiments, one or more of the processes of FIG. 6 may be performed by the MS 150 or by another computer system and/or a device forming part of a PLCS 110 (e.g., a device remote from the MS 150). In this embodiment, the steps are performed by the MS 150.

At step 610, data of the voltage supplied to a first MV power line 10 by a substation may be determined and stored in memory of the database 160 along with time stamp data. This voltage data may be received as real-time or near real time voltage data (e.g., within the most recent five, ten or fifteen minutes). The voltage data may be determined at predetermined times that coincide with the times that current data is read and the CP 40 voltage data is determine. The MS 150 may receive (or access) data of the voltage supplied by substation 14 to the MV power line 10 (e.g., via substation voltage controller 50). In some embodiments, this step may not be necessary.

At step 620, the amount of current being drawn by the same MV power line 10 is determined. This data may be real-time or near real time current data (e.g., within the most recent five, ten or fifteen minutes) and may be obtained at the same time that the MV voltage data of step 610 is obtained.

At step 630, the configuration data of the MV power line is obtained. This may include configurations of one or more capacitor banks, reclosers, switches, and/or other infrastructure.

At step 640, one or more records are retrieved from the database 160. For example, one or more queries of the database 160 may be performed to retrieve the substation voltage that corresponds to the target CP voltage (e.g., 115 volts), for the existing current being drawn (current data of step 620), and with the existing configuration (configuration data of step 630).

At step 650 a voltage instruction is determined. If the database does not include an exact substation voltage data to provide the desired CP voltage for the given current and configuration, two substation voltages may be retrieved based on the data of the two currents in the database that are closest to the existing current (e.g., the data of the closest current above and below the existing current) for the given configuration. The MS 150 may then interpolate between the two substation voltages associated with the two currents to determine a new substation voltage (and provide the voltage instruction). In other words, the interpolation is between the two substation voltages based on their associated CP voltages (to provide the target CP voltage).

If the database does include data of the exact substation voltage to provide the desired voltage for the given current and configuration, this voltage may be used to provide the voltage instruction.

At step 660, the voltage from the substation 14 is adjusted to the new voltage in accordance with the voltage instruction. At step 670, the new voltage and current may be stored in the database 160 along with the time stamp and configuration data. In some instances, a change in the voltage may cause the current to change in some power grids. If the current does change significantly, it may be desirable to obtain and store data of the new current (resulting from the new voltage) with the new voltage.

At step 680, low voltage data from a customer premises receiving power from that MV power line (having its voltage controlled) may be received from a CPVM 300. In this illustrative example, at step 690 the received data is accompanied with a time stamp and stored in the database 160. Due to its time stamp, the received voltage data may be associated (e.g., correlated) in memory with the new voltage, current, and configuration data stored in memory at step 670. Consequently, as more and more voltages are supplied with varying currents and configurations, the database will build a model of the power grid and include information for determining the precise voltage to be supplied to an MV power line to provide a desired customer premises voltage for a given current draw and configuration.

In addition, steps 610-670 may be performed periodically (e.g., every fifteen minutes, hour, or day). Thus, the process may continue from step 670 to step 610 after a delay. Processes 680 and 690 may similarly repeat periodically and in accordance with the same period (although they may be delayed a few minutes to ensure the newly measured CP voltage data corresponds to the new voltage data). In other words, it may be undesirable to measure the CP voltage at the moment the voltage is changed (and more desirable to measure the CP voltage shortly thereafter).

While the above example embodiment has been described in the context of reducing the voltage, it may be desirable increase the voltage received at the customer premises as much as possible as permitted by regulations to reduce line losses. Thus, the present invention may be used to provide any desired (target) voltage to the customer premises.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of using a computer system to regulate a low voltage at a customer premises supplied power via a first medium voltage power line, comprising: storing in a memory a plurality of data sets, each data set comprises a supply voltage data, a supply current data, and data of a measured low voltage; wherein the supply voltage data of each data set comprises data of a voltage supplied to the first medium voltage power line; wherein the supply current data of each data set comprises data of a current supplied to the first medium voltage power line concurrently with the supply voltage of the data set; wherein the data of a measured low voltage of each data set comprises data of a measurement of a voltage of a low voltage power line conductor receiving power from the first medium voltage power line when receiving the supply voltage and the supply current; accessing one or more of the plurality of data sets to determine a voltage to supply to the first medium voltage power line; outputting data of the determined voltage to supply to the first medium voltage power line; and determining a present supply current that comprises one from the group of: a current presently being supplied to the first medium voltage power line and a current to be supplied to the first medium voltage power line; wherein said accessing comprises: retrieving a first supply voltage and a second supply voltage from memory; and interpolating between the first supply voltage and the second supply voltage to determine an interpolated voltage.

2. The method according to claim 1, further comprising supplying the interpolated voltage to the medium voltage power line.

3. The method according to claim 2, further comprising: determining data of a new supply current comprising a current supplied to the first medium voltage power line while the interpolated voltage is supplied to the first medium voltage power line; storing data of the interpolated voltage and the new supply current in the memory in a first data set; and receiving first data of the measured low voltage comprising data of a measurement of a voltage of the low voltage power line conductor when the first medium voltage power line is provided the interpolated voltage and the new supply current; and storing the first data of the measured low voltage in the memory as part of the first data set.

4. The method according to claim 1, further comprising: storing the interpolated voltage and the present supply current in memory in a first data set; and receiving first data of the measured low voltage comprising data of a measurement of a voltage of the low voltage power line conductor when the first medium voltage power line is provided the interpolated voltage and the present supply current; and storing the first data of the measured low voltage in the memory as part of the first data set.

5. The method according to claim 1, wherein said interpolating comprises interpolating between the first supply voltage and the second supply voltage based on a first measured low voltage forming a first data set with the first supply voltage and a second measured low voltage forming a second data set with the second supply voltage.

6. The method according to claim 1, further comprising transmitting a voltage instruction to a control a voltage supplied to the first medium voltage power line by a substation.

7. The method according to claim 1, wherein said accessing comprises: selecting from memory data of one or more supply voltages that each form part of a data set in which a supply current of the data set satisfies a similarity threshold with a present supply current; and determining a present supply voltage based on data of the low voltage measurement of the data set of the one or more supply voltages.

8. The method according to claim 1, further comprising: determining a present supply current that comprises one from the group of: a current presently being supplied to the first medium voltage power line and a current to be supplied to the first medium voltage power line; and wherein said accessing comprises retrieving data of a supply voltage of a data set from the memory based on (a) a supply current that satisfies a similarity threshold with the present supply current and (b) data of a measured low voltage that satisfies a similarity threshold with a target low voltage.

9. The method according to claim 1, wherein said accessing comprises using configuration data, a supply voltage data, a supply current data, and data of a measured low voltage to determine a voltage to supply to the first medium voltage power line.

10. The method according to claim 9, wherein the configuration data comprises configuration data of a capacitor bank connected to the first medium voltage power line.

11. A method of using a computer to regulate a voltage at a customer premises supplied power via a first medium voltage power line, comprising: determining medium voltage (MV) data comprising data of the voltage supplied to the first medium voltage power line at a plurality of times; storing the MV data for each of the plurality of times in a memory; receiving low voltage data comprising data of a low voltage measurement at the customer premises at a plurality of times; storing at least some of the low voltage data in memory in association with MV data that corresponds to the voltage supplied to the first medium voltage power line during the voltage measurement of the low voltage data; determining a voltage to be supplied to the first medium voltage power line based on the MV data stored in memory and the low voltage data stored in memory; and outputting the determined voltage.

12. The method according to claim 11, further comprising: determining current data comprising data of a current supplied to the medium voltage power line at the plurality of times; and storing the current data at each of the plurality of times in memory in association with the MV data of the same time.

13. The method according to claim 12, wherein said determining a voltage to be supplied comprises determining a voltage to be supplied to the first medium voltage power line based on the MV data stored in memory, the current data stored in memory, and the low voltage data stored in memory.

14. The method according to claim 13, further comprising: determining a present supply current that comprises one from the group of: a current presently being supplied to the first medium voltage power line and a current to be supplied to the first medium voltage power line; and wherein said determining a voltage to be supplied comprises retrieving MV data from the memory based on a current data that satisfies a similarity threshold with the present supply current.

15. The method according to claim 13, wherein said determining a voltage to be supplied comprises: selecting from memory one or more MV data, each having an associated current data that satisfies a similarity threshold with a present supply current; and determining a present supply voltage based on the low voltage data associated with the one or more supply voltages.

16. The method according to claim 13, further comprising: determining a present supply current that comprises one from the group of: a current presently being supplied to the first medium voltage power line and a current to be supplied to the first medium voltage power line; and wherein said determining a voltage to be supplied to the first medium voltage power line based on the MV data stored in memory, the current data stored in memory, and the low voltage data stored in memory, comprises: retrieving a first MV data and a second MV data from memory based on their associated current data; and interpolating between the first MV data and the second MV data to determine an interpolated supply voltage.

17. The method according to claim 16, further comprising supplying the interpolated supply voltage to the medium voltage power line.

18. The method according to claim 16, further comprising: storing the interpolated supply voltage in the memory in association with the present supply current; receiving first low voltage data comprising data of a measurement of a low voltage at the customer premises when the first medium voltage power line is provided the interpolated supply voltage and the present supply current; and storing the first low voltage data in the memory in association with data of the present supply current and data of the interpolated supply voltage.

19. The method according to claim 16, wherein said interpolating comprises interpolating between the first MV data and the second MV data based on a first low voltage data associated with the first MV data and a second low voltage data associated with the second MV data.

20. The method according to claim 16, further comprising: determining data of a new supply current comprising a current supplied to the first medium voltage power line while the interpolated supply voltage is supplied to the first medium voltage power line; storing data of the interpolated supply voltage in the memory storing data of the new supply current in the memory in association with the data of the interpolated supply voltage; and receiving first low voltage data comprising data of a measurement of the low voltage when the customer premises is provided the interpolated supply voltage and the new supply current; and storing the first low voltage data in the memory in association with data of the new supply current and data of the interpolated supply voltage.

21. The method according to claim 11, further comprising transmitting a voltage instruction to a control a voltage supplied to the first medium voltage power line by a substation.

22. The method according to claim 11, further comprising: determining a present supply current that comprises one from the group of: a current presently being supplied to the first medium voltage power line and a current to be supplied to the first medium voltage power line; and wherein said determining a voltage to be supplied comprises retrieving a voltage data from the memory based on (a) a current data that satisfies a similarity threshold with the present supply current and (b) low voltage data that satisfies a similarity threshold with a target low voltage.

23. A method of using a computer to regulate the voltage at a customer premises supplied power via a first medium voltage power line, comprising: determining medium voltage (MV) data comprising data of the voltage supplied to the first medium voltage power line at a plurality of times; storing the MV data for each of the plurality of times in a memory; determining current data comprising data of a current supplied to the medium voltage power line at the plurality of times; storing the current data at each of the plurality of times in memory in association with the voltage data of the same time; receiving low voltage data comprising data of a voltage measurement of a low voltage power line conductor at the customer premises at a plurality of times; storing at least some of the low voltage data in memory in association with MV data that corresponds to the voltage supplied to the first medium voltage power line during the voltage measurement of the low voltage power line conductor; and determining a supply voltage to be supplied to the first medium voltage power line based on the current data stored in memory, the MV data stored in memory, and the low voltage data stored in memory; receiving new low voltage data comprising data of a voltage measurement of the low voltage power line conductor at the customer premises taken while the supply voltage is being supplied to the first medium voltage power line; and storing the new low voltage data in memory in association with data of the supply voltage.

24. The method according to claim 23, wherein said storing the new low voltage data comprises storing the new low voltage data in memory in association with data of the supply voltage and in association with data of a current being supplied to the first medium voltage power line during the voltage measurement of the new low voltage data.

* * * * *